United States Patent Office 3,655,722
Patented Apr. 11, 1972

3,655,722
7-METHYL-OCTADIENENITRILES
Peter W. D. Mitchell, Atlantic Highlands, and Jack Herbert Blumenthal, Oakhurst, N.J., assignors to International Flavors & Fragrances, Inc., New York, N.Y.
No Drawing. Original application Feb. 2, 1967, Ser. No. 613,445, now Patent No. 3,553,110, dated Jan. 5, 1971. Divided and this application Jan. 26, 1970, Ser. No. 12,022
Int. Cl. C07c 121/30
U.S. Cl. 260—465.9        3 Claims

ABSTRACT OF THE DISCLOSURE

This disclosure describes methods for the preparation and isolation of a variety of 7-methyl-2,6-octadienenitriles by condensation of cyanoacetic acid with 2-methyl-hept-2-ene-6-one in the presence of an amine or an acid addition salt of an amine at a temperature of from about 40° C. to 180° C. A mixture of nitriles is produced in the condensation reaction. The relative proportion of each nitrile in the mixture can be controlled by control of the alkalinity of the reaction medium. The compounds and mixtures are useful as olfactory agents.

---

This application is a division of co-pending patent application Ser. No. 613,445, filed Feb. 2, 1967.

This invention relates to a novel process for the preparation of unsaturated octanitriles. It relates also to perfume compositions containing effective amounts of one or more of these valuable compounds as olfactory ingredients.

More particularly, this invention relates to certain unsaturated aliphatic nitriles characterized by seven carbon atoms in a straight chain attached to the nitrile group, a methyl group on the number seven carbon atom, a methyl or methylene group on the number three carbon atom and at least one point of unsaturation in the said chain. The compounds are named as indicated below and may be represented by the following formulas:

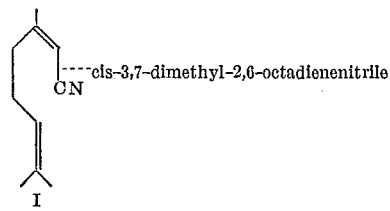

cis-3,7-dimethyl-2,6-octadienenitrile

I

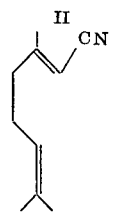

II trans-3,7-dimethyl-2,6-octadienenitrile

III

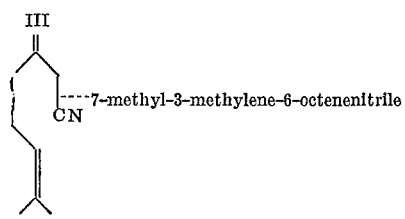

7-methyl-3-methylene-6-octenenitrile

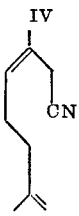

IV 3,7-dimethyl-3,7-octadienenitrile

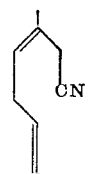

cis-3,7-dimethyl-3,6-octadienenitrile

V

trans-3,7-dimethyl-3,6-octadienenitrile

VI

Compound I is also known as neronitrile and Compound II is known as geranonitrile. For convenience the above compounds will occasionally be referred to hereinafter by the above number designations. Compounds III, IV, V and VI are new compounds.

The compounds prepared in accordance with the process of this invention are useful as components of perfume compositions. The perfume compositions may be used alone or they may be blended into soaps, detergents, space sprays, cosmetics and the like to enhance their acceptability. Individual compounds may be isolated from the reaction mixture, but normally the compounds will be prepared and utilized as a mixture in the preparation of perfume compositions. It has not as yet proved possible to separate the cis-trans isomers of 3.7-dimethyl-3,6-octadienenitrile, i.e. compounds V and VI, one from the other.

The term "perfume composition" is used herein in the usual sense to mean a mixture of organic compounds, including, for example, alcohols, aldehydes, ketones, esters and, frequently, hydrocarbons which are combined in fixed proportions so that the combined odors of the individual compounds produce a pleasant fragrance.

It is possible, and in many instances desirable to carry out the process of the invention under conditions such that compounds III, IV, V and VI predominate in the mixture or such that compounds I and II predominate. It will be noted that in compounds I and II the double bond closest to the nitrile group is actually conjugated with that group, and that in compounds III, IV, V and VI no such conjugation exists. For convenience, the former group of compounds will be referred to as conjugated nitriles, and the latter as unconjugated nitriles.

In accordance with the process of this invention, the above described compositions are prepared by a condensation reaction between the known compounds cyanoacetic acid and 2-methyl-hept-2-ene-6-one in the presence of an organic amine or an amine salt. Reaction is effected in an organic solvent containing up to about nine carbon atoms at an elevated temperature of from about 40° C. to about 180° C. The preferred range, from the point of view of completing the reaction in a convenient time period while obtaining good yields, is from 80° C. to 140° C.

In the course of the reaction, water is split out between the two reacting molecules. It is most convenient to remove the water as it forms, preferably by azeotropic distillation. Accordingly, although a variety of organic solvents, especially aromatic solvents such as xylene, ethyl benzene and the like can be employed, it is preferred to use solvents such as benzene and toluene which are relatively inexpensive and form azeotropic mixtures with water within the temperature range at which the reaction is carried out.

The time of the reaction is not critical. It depends principally upon the quantity of reactants and the reaction temperature. It is most convenient to follow the reaction by removing water as it forms. When no further water can be collected, the reaction may be considered to be substantially complete.

Although equimolar quantities of reactants may be employed, it is preferred to utilize an excess of the cyanoacetic acid since this is the less expensive of the two reagents. Normally, up to 50% molar excess of acid will be used.

As aforesaid, it is possible by control of the reaction conditions to predetermine whether the mixture will contain a major proportion of conjugated nitriles or a major proportion of unconjugated nitriles. This result may be effected by selection of the condensation catalyst or the amount of catalyst. If an amine salt is used to catalyze the reaction, or if less than an equimolar quantity of amine, based on the amount of cyanoacetic acid is used as a catalyst, the resulting composition will contain a major proportion of unconjugated compounds. If the reaction is carried out under alkaline conditions, i.e. with a molar excess of amine based on the cyanoacetic acid, the composition will contain a major proportion of conjugated compounds.

Typical of the primary, secondary and tertiary amines which can be used in the process of the invention are piperidine, pyridine, cyclohexyl amine, aniline, triethanolamine and paratoluidene. Organic and inorganic acid salts of these amines, especially mineral and organic, alkanoic, carboxylic acid salts containing up to five carbon atoms in the acid moiety, can be utilized. Triethanolamine, cyclohexylamine and ammonium acetate are preferred catalysts because of their relatively low cost.

The following non-limiting examples illustrate the process of this invention. In Example I the composition produced contains a major proportion of unconjugated compounds. The composition of Example II contains mostly conjugated compounds.

EXAMPLE I

A stirred mixture of 68.1 kg. of 2-methyl-hept-2-ene-6-one, 55.4 kg. of cyanoacetic acid, 94 kg. of toluene and 5.3 kg. of triethanolamine is heated to the reflux point during a period of two hours. The mixture is then refluxed for a period of 19 hours to collect an azeotropic mixture of toluene and water containing 7.9 liters of water. The reaction mixture is washed four times with an equal volume of brine. A total of 53.6 kg. of toluene is recovered at reduced pressure and the residue distilled at 2 mm. to give 54.6 kg. of crude product boiling at 40-150° C. This product is fractionated by distillation at 2 mm. of mercury pressure and at 9:1 reflux ratio to give 8.52 kg. of unreacted 2-methyl-hept-2-ene-6-one at 36° C., and 15.9 kg. of the desired mixture boiling at 84° C. This mixture has the following physical properties: specific gravity 0.8765, $n_D^{20}$ 1.4710. It is separated into its components by gas-liquid chromatography using helium as the gas and two five foot, one-quarter inch inside diameter tubes in tandem at 100° C. and a flow rate of 80 ml. per minute. The absorbent in the first tube is 5% polyethylene glycol (Carbowax 20 M) and in the second 5% silicone rubber (SE 30 gum rubber). The mixture contains about 6% of compound I, 27% of compound II, 27% of compound III, 2.6% of compound IV and 38% of a mixture of compounds V and VI. The compounds, except for compound IV are identified by nuclear magnetic resonance, mass spectrometry and infrared analysis. Compound IV is identified by its infrared and mass spectra.

The NMR characteristics of Compounds I, II, III, V and VI are as follows:

COMPOUND I

| Proton type: | Chemical shift (p.p.m.) |
|---|---|
| Olefine protons | 5.08 (m). |
| =C—CH$_2$ | 2.32 (t). |
| CH$_3$—C=C—CN | 1.91 (d). |
| Allylic methyls | 1.48 (diffuse d). |

COMPOUND II

| Proton type: | Chemical shift (p.p.m.) |
|---|---|
| Olefine protons | 5.08 (m). |
| =C—CH$_2$ | 2.2 (diffuse). |
| CH$_3$—C=C—CN | 2.05 (d). |
| Allylic methyls | 1.46 (d). |

COMPOUND III

| Proton type: | Chemical shift (p.p.m.) |
|---|---|
| >C=CH$_2$ | 4.7 (broad). |
| =C—CH$_2$—C—N | 2.98 (broad s). |
| =C—CH$_2$— | 2.12 (diffuse t). |
| Allylic methyls | 1.52 (broad s). |

COMPOUNDS V AND VI

| Proton type: | Chemical shift (p.p.m.) |
|---|---|
| Olefinic proton | 5.4 (diffuse t). |
| Olefinic proton | 5.03 (diffuse t). |
| =C—CH$_2$—CH | 2.98 (broad s). |
| =C—CH$_2$—C= | 2.70 (t). |
| Allylic methyls | 1.68 (at least 3 discrete signals). |

The salient infrared characteristics of compound IV manifest the characteristics of an unconjugated nitrile at 4.44$\mu$ and an isopropenyl moiety at 11.26$\mu$. The molecular weight by mas spectrograph is 149.

EXAMPLE II

A total of 15 moles of cyanoacetic acid followed by 10 moles of 2-methyl-hept-2-ene-6-one is added to 400 mls. of dioxane while a slow stream of nitrogen is bubbled through the mixture. There is then added 15.8 moles of cyclohexylamine with stirring. There is an exotherm, and the temperature is regulated externally so that it does not increase above 50° C. during the addition which takes about 95 minutes. After all of the amine is added, stirring is continued while refluxing the mixture at 95°–100° C. for 7 hours. The mixture is then cooled and washed as follows:

(i) Twice with equal volumes of 10% brine
(ii) 10% sulfuric acid until the washings are acid
(iii) Again with brine to neutrality The washings are each extracted with ⅓ the volume of toluene and the combined organic layer and toluene extracts distilled to remove the solvent. The residue is further distilled to remove unreacted ketone and the product comprising a mixture of nitriles is taken off at a 1:1 reflux ratio. The mixture is separated into its components by gas-liquid chromatography using the procedure of Example I. The mixture from which the components are isolated contains 35% by weight of compound I, 60% of compound II and 5% of a mixture of compounds III, IV and V.

The mixtures obtained by the process of this invention or the components of the mixture may be utilized alone, for example, in cachets for use in bureaus and in closets, or they may be utilized as olfactory components in detergents, cosmetics, soaps, space deodorants and other formulations. When so used they contribute a fresh, citrusy, lemon-like odor similar to that obtained with citral. Mixtures containing a major proportion of conjugated nitriles have a powerful, somewhat harsh aroma. Those with a major proportion of unconjugated nitriles have a softer, more delicate aroma.

In perfume compositions the individual component will contribute its particular olfactory characteristic, but the overall effect of the perfume composition will be the sum of the effect of each ingredient. Thus the individual compounds of this invention, or mixtures thereof may be used to alter the aroma characteristics of a perfume composition, for example, by highlighting or moderating the olfactory reaction contributed by another ingredient in the composition.

The following examples illustrate perfume mixtures, soap and other formulations within the scope of this invention. It is to be understood that these compositions are preferred examples, and the invention is not to be considered as restricted thereto except as indicated in the appended claims.

In the examples the soap base and soap chips used are unperfumed sodium based toilet soaps made from tallow and coconut oil. The detergent powder is a powder obtained from Lever Bros. Co. and sold under the trademark Rinso. The liquid detergent is a product manufactured by Ultra Chemical Co., and is known as P-87 liquid detergent.

EXAMPLE III

Preparation of soap compositions

A total of 100 grams of soap chips are mixed with one gram of each of the perfume compositions given below until a substantially homogeneous composition is obtained. Both soap compositions manifest a characteristic lemon-like odor with the composition containing the mixture from Example II having the more delicate aroma at some sacrifice in strength.

The perfume compositions consist of the following ingredients in the parts by weight indicated:

| | |
|---|---|
| Geranium bourbon | 175 |
| Citronellol | 150 |
| Geraniol | 100 |
| Phenyl ethyl alcohol | 90 |
| Amyl cinnamic aldehyde | 200 |
| Cyclamal | 20 |
| Lyral[1] | 100 |
| Tetrahydro linalool | 37.5 |
| Tetrahydro myrcenol | 37.5 |
| Linalool | 75 |
| Citronellyl acetate | 125 |
| Phenyl ethyl acetate | 5 |
| Phenyl acetaldehyde dimethyl acetal | 10 |
| Cinnamic alcohol | 35 |
| Terpineol | 100 |
| Linalyl acetate | 25 |
| Musk ketone | 10 |
| Indole | 10 |
| Mixture from Examples I or II | 10 |

[1] Lyral is the registered trademark of International Flavors & Fragrances, Inc., for 4-(4-methyl, 4-hydroxy amyl)-Δ-3-cyclohexene carboxaldehyde.

Similar results are obtained when the mixtures of Examples I and II are replaced with the components of the mixtures.

EXAMPLE IV

Preparation of detergent composition

A total of 100 grams of a detergent powder are mixed with a 0.15 gram of a perfume compositoin containing the mixture obtained in Example I until a substantially homogeneous composition having a lemon-like odor is obtained.

The perfume composition consisted of the following ingredients in parts by weight indicated:

| | |
|---|---|
| Decyl aldehyde, 10% solution in diethyl phthalate | 4 |
| Terpinyl acetate | 100 |
| Terpineol | 40 |
| Linalool acetate | 100 |
| Orange oil | 350 |
| Geranyl acetate | 100 |
| Geraniol | 35 |
| Coumarin | 2 |
| Mixture produced by procedure of Example I | 70 |

A similar result is obtained by replacing mixture I with mixture II or its components.

EXAMPLE V

Preparation of cosmetic powder composition

A cosmetic powder is prepared by mixing 100 grams of talcum powder with 0.25 gram of the mixture obtained in Example I in a ball mill. A second cosmetic powder is similarly prepared except that mixture produced by the procedure of Example I is replaced with the mixture from Example II. Both have a lemon-like odor.

EXAMPLE VI

Liquid detergent containing 7-methyl-3-methylene-6-octenenitrile

Concentrated liquid detergents with a lemon-like odor are prepared containing 0.1%, 0.2% and 0.5% of 7-methyl-3-methylene-6-octenenitrile and prepared by adding the appropriate quantity of the compound to the liquid detergent The amount of mixtures or compounds of this invention which will be effective in perfume compositions depends on many factors, including the other ingredients, their amounts and the effects which are desired. It has been found that perfume compositions containing as little as 0.02% by weight of mixtures or compounds of the invention, or even less may be usefully employed. For certain compositions as much as 5% by weight or even higher is useful. When used in soaps and other products the amount of perfume composition is the same as in generally employed with ordinary compositions, i.e. from about 1% to about 3% by weight. Thus, as little as 0.0002% by weight of a product or mixture of products of this invention may be used to impart a lemon-like ordor to soaps, cosmetics and other products.

EXAMPLE VI

A total of 93.5 g. (1.1 moles) of cyanoacetic acid, 126 g. (1.0 mole) of 2-methyl-hept-2-ene-6-one and 3.85 g. (0.05 mole) of ammonium acetate in 100 ml. of benzene are refluxed until approximately 18 ml. of water are removed. The mixture is then washed 3 times with dilute hydrochloric acid and the solvent removed by distillation at about 40 mm. of mercury pressure. The mixture is then heated to effect decarboxylation and the residue distilled at high vacuum. The residue is separated into its components by gas-liquid chromatography in accordance with the procedure of Example I. The mixture from which the components are isolated contains 7.0% by weight of Compound I, 21.0% by weight of Compound II, 28.4% by weight of Compound III and 38.5% by weight of Compounds V and VI.

While the description of this invention has been given in terms of what are presently considered the preferred embodiments, it will be obvious to those skilled in the art that various changes and modifications can be made therein without departing from the spirit and scope of the invention. It is the intention therefore, that the appended claims cover all such changes and modifications as fall within the spirit and scope of the invention.

What is claimed is:
1. 7-methyl-3-methylene-6-octenenitrile.
2. 3,7-dimethyl-3,7-octadienenitrile.
3. A mixture of cis and trans isomers of 3,7-dimethyl-3,6-octadienenitrile.

References Cited

UNITED STATES PATENTS

| 3,168,550 | 2/1965 | Blumenthal | 260—464 |
| 3,265,739 | 8/1966 | Blumenthal | 252—522 X |
| 3,325,369 | 6/1967 | Somerville et al. | 252—522 X |

OTHER REFERENCES

Migrdichian, "The Chemistry of Organic Cyanogen Compounds," 1947, p. 319.

JOSEPH PAUL BRUST, Primary Examiner

UNITED STATES PATENT OFFICE
CERTIFICATE OF CORRECTION

Patent No. 3,655,722                    Dated April 11, 1972

Inventor(s) PETER W.D. MITCHELL and JACK HERBERT BLUMENTHAL

It is certified that error appears in the above-identified patent and that said Letters Patent are hereby corrected as shown below:

Col. 2, lines 20-29, correct the formula VI to read:

VI trans-3,7-dimethyl-3,6-octadienenitrile

Col. 4, line 45, correct the spelling of "mass".

Col. 5, line 3, change "cachets" to --sachets--.

Col. 5, line 75, correct the spelling of "compositions"

Col. 6, line 50, change "in" to --is--

Col. 6, line 54, "ordor" should read --odor--.

Signed and sealed this 15th day of May 1973.

(SEAL)
Attest:

EDWARD M. FLETCHER, JR.
Attesting Officer

ROBERT GOTTSCHALK
Commissioner of Patents